(12) United States Patent
Bertini

(10) Patent No.: US 9,506,348 B2
(45) Date of Patent: Nov. 29, 2016

(54) METHOD FOR MAKING A SHAPED TURBINE AEROFOIL

(71) Applicant: GE AVIO S.r.L., Rivalta Di Torino (IT)

(72) Inventor: Francesco Bertini, Frossasco (IT)

(73) Assignee: GE AVIO S.r.L. (IT)

( * ) Notice: Subject to any disclaimer, the term of this patent is extended or adjusted under 35 U.S.C. 154(b) by 72 days.

(21) Appl. No.: 14/355,983

(22) PCT Filed: Nov. 2, 2012

(86) PCT No.: PCT/IB2012/056122
§ 371 (c)(1),
(2) Date: May 2, 2014

(87) PCT Pub. No.: WO2013/065023
PCT Pub. Date: May 10, 2013

(65) Prior Publication Data
US 2014/0298651 A1    Oct. 9, 2014

(30) Foreign Application Priority Data
Nov. 3, 2011  (IT) .............................. TO2011A1009

(51) Int. Cl.
*F01D 5/14*    (2006.01)
(52) U.S. Cl.
CPC ............... *F01D 5/141* (2013.01); *F01D 5/145* (2013.01); *F05D 2230/00* (2013.01); *Y10T 29/49336* (2015.01)
(58) Field of Classification Search
CPC ........ F01D 5/141; F01D 5/145; F01D 5/142; Y10T 29/49336; F05D 2230/00
See application file for complete search history.

(56) References Cited

U.S. PATENT DOCUMENTS

| | | | |
|---|---|---|---|
| 4,741,667 A | 5/1988 | Price | |
| 6,036,438 A * | 3/2000 | Imai | ........................ F01D 5/142 415/192 |
| 6,354,798 B1 | 3/2002 | Deckers | |
| 6,398,489 B1 | 6/2002 | Burdgick | |
| 2002/0141863 A1 | 10/2002 | Beacher | |
| 2003/0002975 A1 | 1/2003 | Dudebout | |
| 2005/0019157 A1* | 1/2005 | Tominaga | ................. F01D 5/14 415/192 |
| 2008/0148654 A1 | 6/2008 | Gilleran | |

FOREIGN PATENT DOCUMENTS

| | | |
|---|---|---|
| EP | 0 251 978 A2 | 1/1988 |
| EP | 1 939 399 A2 | 7/2008 |
| WO | WO 99/13199 A1 | 3/1999 |

OTHER PUBLICATIONS

PCT/IB2012/056122—International Search Report mailed Jan. 28, 2013.
PCT/IB2012/056122 Written Opinion of the International Searching Authority mailed Jan. 28, 2013.

* cited by examiner

*Primary Examiner* — David Bryant
*Assistant Examiner* — Jun Yoo
(74) *Attorney, Agent, or Firm* — Davidson Berquist Jackson & Gowdey, LLP

(57) ABSTRACT

According to the method, a turbine aerofoil is made starting from a reference aerofoil, locally reducing the metallic exit angle at the trailing edge in two areas which substantially correspond, in use, to the position of the peaks of the secondary flows in the boundary layer.

6 Claims, 5 Drawing Sheets

METHOD FOR MAKING A SHAPED TURBINE AEROFOIL

TECHNICAL FIELD

The present invention relates to a method for making a turbine aerofoil.

BACKGROUND ART

As it is known, in a turbine blading, along the height of each aerofoil, variation of the load exerted by the primary gas flow (the load is proportional to the difference in pressure between the pressure side and the suction side) in general is imposed as a linear interpolation trend between the load conditions at the two opposite ends of the aerofoil.

Recently, load distributions with a parabolic trend rather than a linear trend have been proposed and adopted, so as to decrease the load (and therefore the difference in pressure between the pressure side and the suction side) in proximity of the endwalls, and the radial ends of the blading.

In fact, this tends to limit the secondary flows losses in the boundary layer at the endwalls, as the higher the difference in pressure in the interblade channel between pressure side and suction side is, the higher the boundary layer and corresponding secondary flow losses become.

A schematic illustration of the phenomenon of secondary flow generation in an interblade channel is indicated in FIG. 1. The secondary flows are essentially generated by the difference in pressure between the pressure and suction sides of the two adjacent blades and flow along the boundary layer in circumferential direction in proximity of the endwalls: therefore, they are orthogonal to the direction of the primary gas flow in the interblade channel. These flows in circumferential direction generate a flow also along the pressure and suction sides of the two adjacent blades, again orthogonal to the direction of the primary gas flow.

As mentioned above, it has been attempted to limit secondary flow losses in the turbine blading by reducing the difference in pressure between pressure side and suction side: in fact, this tends to reduce the thrust that leads to the generation of flows in circumferential direction inside the boundary layer close to the endwalls in the interblade channel.

The various proposals relating to "Side Wall Contouring" technologies of non axisymmetric type, i.e. relating to non-circular shape of the endwalls, have also had the same objective and focus.

DISCLOSURE OF INVENTION

The object of the present invention is to provide a method for making a turbine aerofoil which enables the problems indicated above to be solved, simply and inexpensively, by means of a solution that can be used in addition or alternatively to the known configurations indicated above.

According to the present invention, there is provided a method for making a turbine aerofoil as defined by claim 1.

BRIEF DESCRIPTION OF THE DRAWINGS

The invention will now be described with reference to the accompanying drawings, which illustrate a non-limiting example of embodiment thereof, wherein.

BEST MODE FOR CARRYING OUT THE INVENTION

Figure 2:
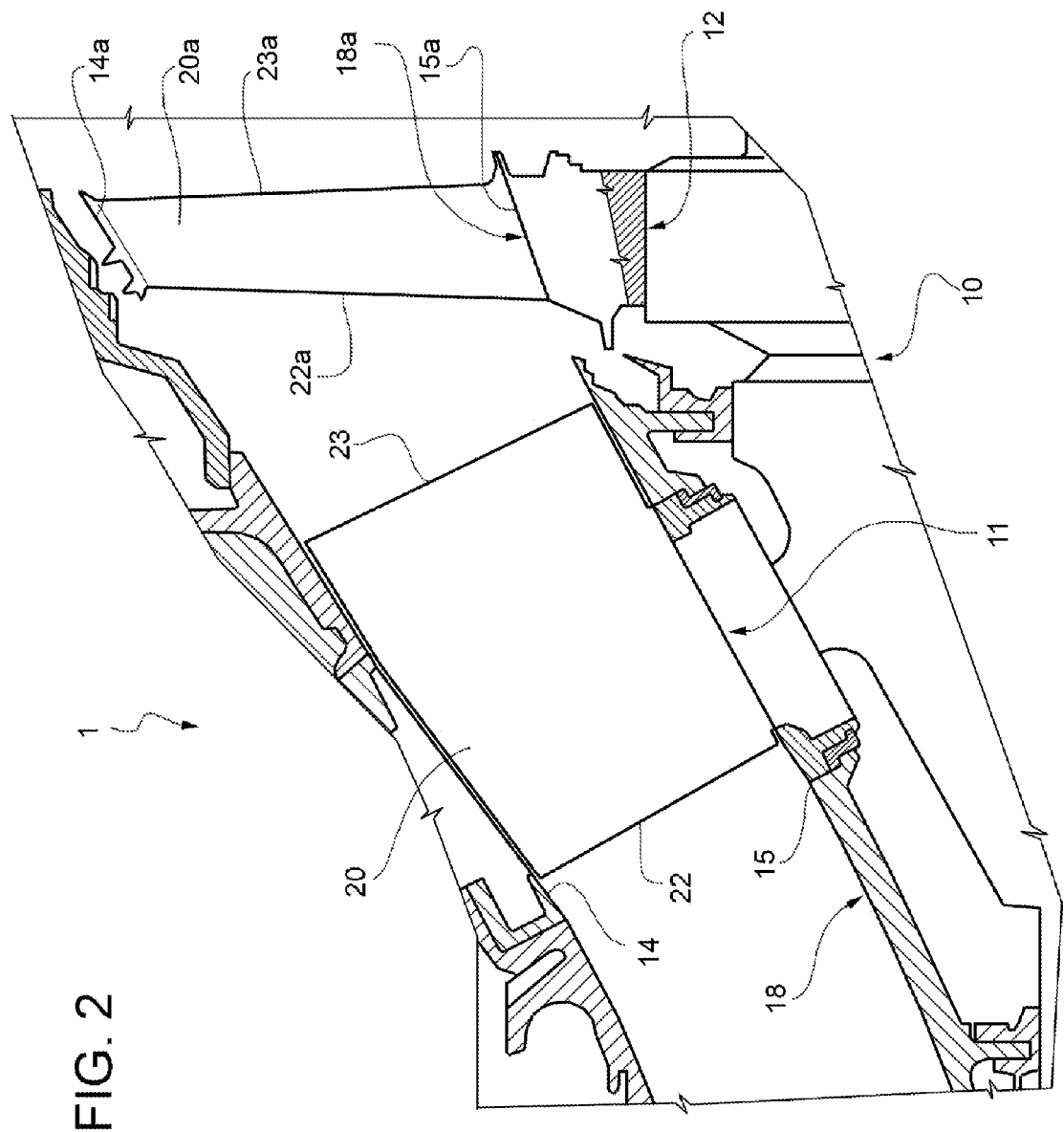
FIG. 2 partly illustrates a turbine stage, in a section along a meridian plane.

In FIG. 2, the numeral 1 indicates as a whole an axial turbine (schematically and partially illustrated), which forms part of an aeronautical engine, not illustrated, and has axial symmetry with respect to an axis thereof (not indicated).

Figure 1:
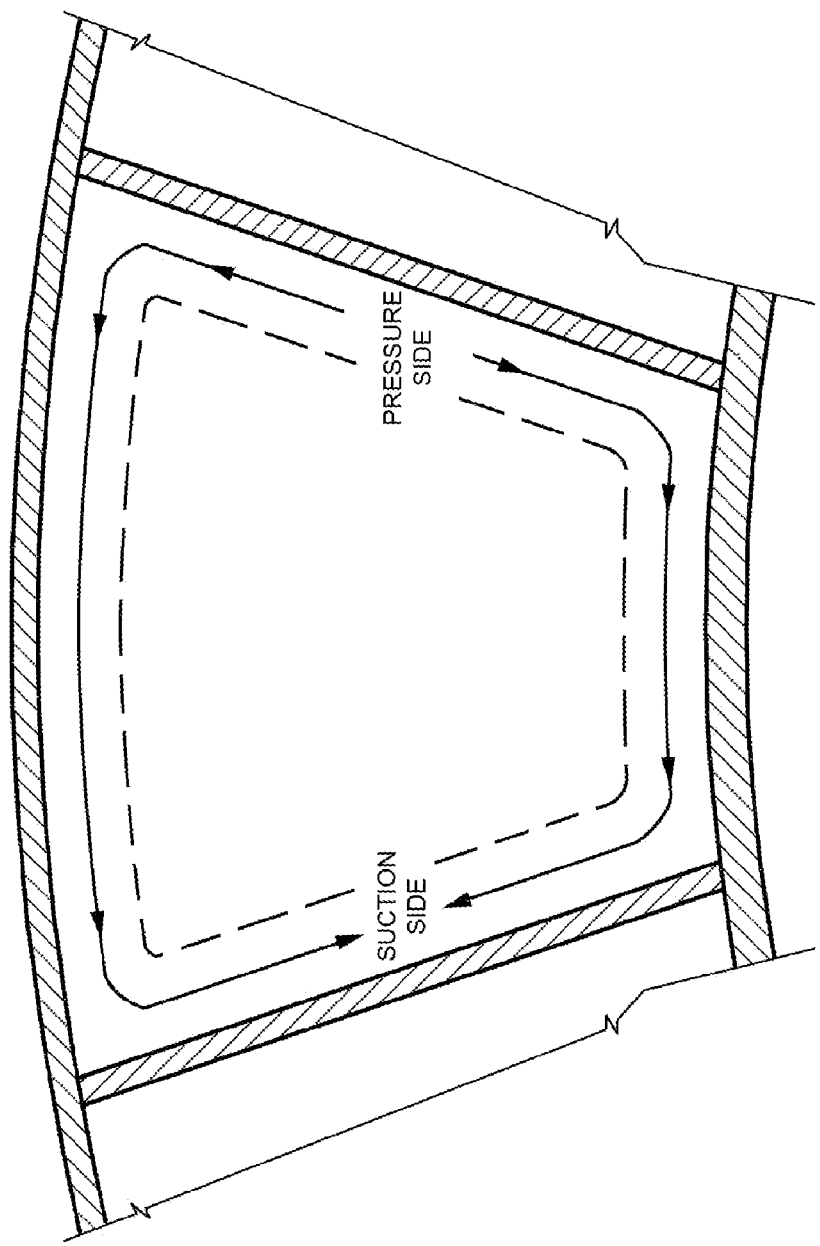
FIG. 1 is a diagram showing the phenomenon of secondary flow generation in an interblade channel of a turbine stage.

The turbine 1 comprises a succession of coaxial stages, of which only one is indicated with 10 in FIG. 1 and comprises a stator 11 and a rotor 12, arranged downstream of the stator 11.

The stator 11 comprises, in turn, an external annular endwall 14 and an internal annular endwall 15, which are facing each other and radially delimit therebetween an annular duct 18, adapted to convey an expanding gas flow and having an average diameter increasing in the direction of advance of the gas flow.

The endwalls 14,15 support an array of blades or aerofoils 20 (only one of which is illustrated), which are angularly equidistant from one another around the axis of the turbine, are housed in the duct 18, and delimit, circumferentially with respect to the axis of the turbine, a plurality of nozzles or interblade channels.

Analogously, the rotor 12 comprises an external annular endwall 14a and an internal annular endwall 15a, which are facing each other and radially delimit therebetween an annular duct 18a, which forms the extension of the duct 18 to convey the expanding gas flow with increasing average diameter. The rotor 12 also comprises an array of blades or aerofoils 20a (only one of which is illustrated), arranged radially between the endwalls 14a,15a so as to be housed in the duct 18a, angularly equidistant from one another around the axis of the turbine and delimiting, circumferentially with respect to the axis of the turbine, a plurality of nozzles or interblade channels.

According to the present invention, the exit angle at the trailing edge 23 of the aerofoil 20,20a is optimised to minimise secondary flows, following more complex load variation laws with respect to the parabolic law along the height of the same aerofoil.

In particular, in the design phase, a fourth degree polynomial law can be applied for variation of the load along the height of the aerofoil 20: this law makes it possible to obtain local pressure distributions which oppose the motion of the secondary flows along the sides of the aerofoil 20 in direction orthogonal to the direction of the primary gas flow, and a reduction of the load in proximity of the endwalls 14,15.

The load variation imposed corresponds to a variation of the metallic exit angle defined by the trailing edge 23 of the aerofoil 20 of the present invention (FIG. 3) with respect to a reference geometry or configuration: the geometry of a standard aerofoil in which the load variation (and therefore the variation of the pressure difference between pressure and suction sides, which is proportional to the load) is of parabolic type, is taken as reference configuration.

Figure 4:
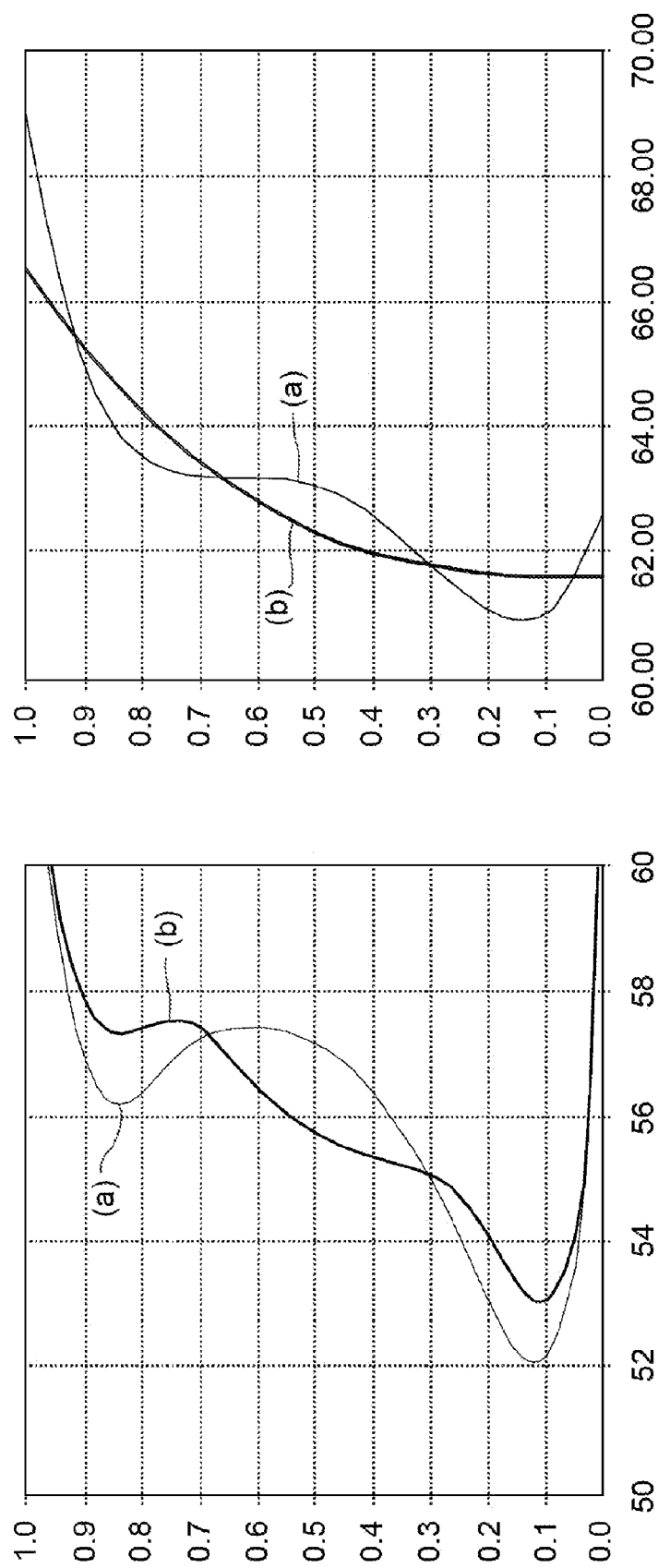
FIG. 4 shows two diagrams relating to the exit angles of the aerofoil of FIG. 3, in comparison with the exit angles of a standard aerofoil.

FIG. 4 includes two graphs that show the differences of the aerofoil 20 with respect to the standard aerofoil:

1) the graph on the right shows, on the axis of abscissas, the metallic exit angle, i.e. the exit angle defined by the geometry of the trailing edge, for the standard aerofoil and for the aerofoil 20 of the present invention, as a function of the adimensional height of the aerofoils (axis of ordinates);

2) the graph on the left is obtained through experimental trials or through simulations on computer programs and shows, on the axis of abscissas, the gas efflux angle from the trailing edge of the standard aerofoil compared with the efflux angle from the trailing edge 23 of the aerofoil 20 of the present invention, as a function of the adimensional height of the aerofoils (on the axis of ordinates).

The curves indicated with the reference letter (a) relate to the aerofoil 20 of the present invention, while the curves indicated with the reference letter (b) relate to the standard aerofoil.

According to the present invention, the metallic exit angle is modified with respect to that of the standard aerofoil so as to decrease it in two areas 25 and 26, which are close to the endwalls 14,15 in which the boundary layer is present and which correspond substantially to the position of the peaks of the secondary flows in the boundary layer.

Usually, the areas 25,26 corresponding to the peaks of the secondary flows are in the range between 75% and 90% and, respectively, between 10% and 25% of the height of the aerofoil.

In the example shown in the graph on the right of FIG. 4, the reduction of the metallic exit angle with respect to that of the standard aerofoil is less than 2°.

The reduction of the metallic exit angle at the trailing edge 23 and therefore of the gas efflux angle corresponds to local "opening" of the exit angle and therefore to generation of a preferential exit route and to local acceleration of the primary gas flow. In practice, this preferential exit route tends to carry the secondary flows away toward the trailing edge 23 and therefore limits the formation thereof along the endwalls 14, 15.

Figure 3:
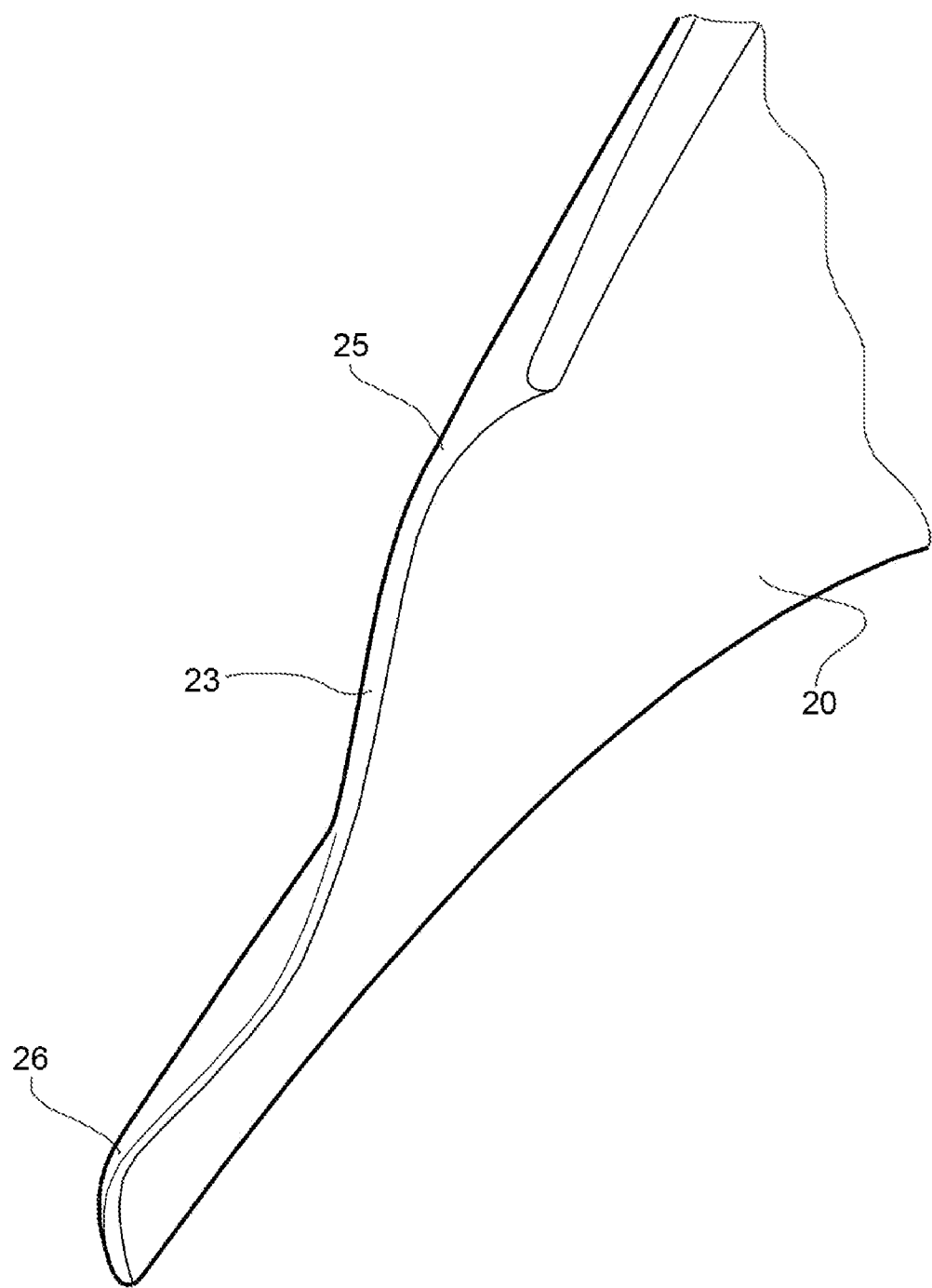
FIG. 3 partly illustrates a preferred embodiment of the aerofoil of a turbine made by means of the method of the present invention.

As can be seen in the graph on the right in FIG. 4 and in FIG. 3, in the remaining areas of the trailing edge 23 of the aerofoil 20, the metallic exit angle increases with respect to that of the standard aerofoil, so as to substantially restore the same average value of the metallic exit angle of the standard aerofoil.

As a result, the trailing edge 23 of the aerofoil 20 has a wavy or snake-like trend (FIG. 3): in other words, in the two areas in which the metallic exit angle is reduced, the concavity is facing in the opposite direction to those of the remaining areas.

By adopting this geometry, i.e. designing the metallic exit angle as indicated above, it can be noted in the graph on the left of FIG. 4 that the curve (a) relating to the gas efflux angle from the trailing edge has a smaller number of humps with respect to the curve (b). This reduction of the humps derives from the reduction of losses due to the secondary flows on the aerofoil 20.

Figure 5:
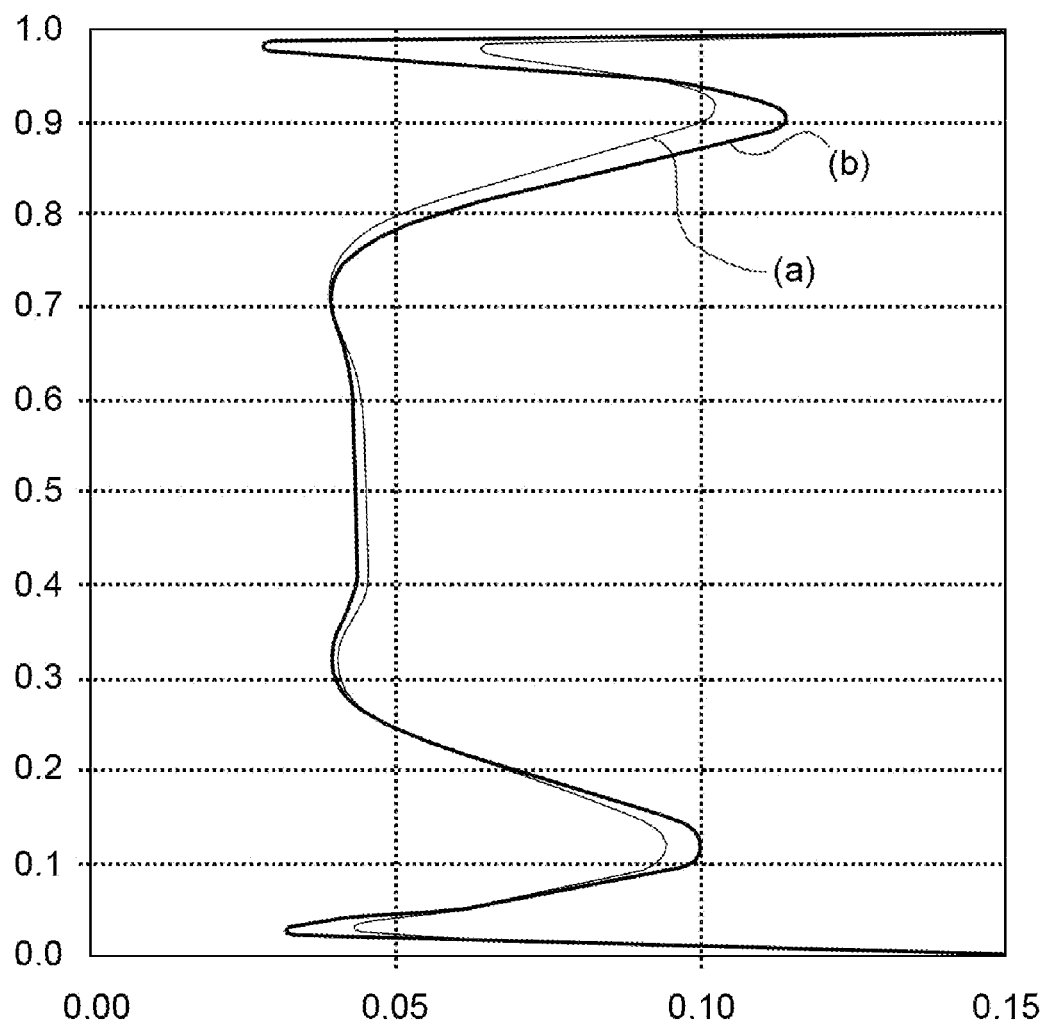
FIG. 5 is a graph illustrating a comparison between the losses of the aerofoil of FIG. 3 and those of a standard aerofoil, along the whole of the height of the profiles.

The reduction of secondary flows losses is evident from FIG. 5.

The adimensional height of the aerofoil 20 and of the standard aerofoil is indicated along the axis of ordinates, while the value of the losses is indicated along the axis of abscissas.

In proximity of the areas 25,26, i.e. at the peaks of secondary flows (at 10% and at 90% of the height of the aerofoils), the losses are reduced for the curve (a) with respect to the curve (b), while at half the height of the aerofoils the losses relating to the two configurations are very close.

The advantages of the shaping proposed are therefore evident for those skilled in the art of fluid dynamics.

In particular, the solution proposed not only enables a reduction in the load at the endwalls, but also reduces the tendency of the gases to move along the pressure side from the midspan of the interblade channel towards the endwalls 14,15.

In particular, by locally "opening" the trailing edge of the aerofoil, i.e. reducing the metallic exit angle, in the areas between 10-25% and 75-90% of the height of the interblade channel, two primary positive effects are obtained.

The first effect, as mentioned above, relates to the fact that more gases are encouraged to pass through the areas 25,26, where an opening of the angle has been implemented. Therefore, two preferential escape routes are formed on the pressure side, which oppose the tendency of the gases to move towards the endwalls 14,15 and to generate undesirable secondary flows.

The second positive effect relates to the fact that a reduction of local pressure is obtained in the areas 25,26 on the pressure side, which also opposes the generation of flows in radial direction.

The secondary flow losses have an impact of around 30% on the performance of a low pressure turbine (LPT) module and the solution claimed can reduce the intensity of the secondary flows thereof by around 20%: in this way, it is possible to increase the performance of a turbine module by a value of around 0.1%, with impacts of the same level on the specific fuel consumption for the module to which this solution is applied.

The parameter effectively of interest to obtain the advantages described above is the "throat angle", i.e. the angle formed by a line that is perpendicular to the section of throat between two adjacent blades, as it is the one with direct influence on the efflux angle of the gas exiting from the interblade channel. With the same other geometrical characteristics with respect to the standard aerofoil, the throat angle is correlated uniquely to the metallic exit angle which has been used in the present treatment for simplicity and convenience of viewing in the accompanying figures. In other words, the indication "throat angle" or "metallic exit angle" are equivalent, as the absolute values of these angles change but their trend is analogous.

Finally, from the above it is evident that variants and modifications can be made to the method for making the aerofoil described without departing from the scope of protection of the present invention, as defined in the appended claims.

In particular, the reduction of the metallic exit angle at the boundary layer can be applied both to stator vanes and to rotor blades, i.e. at the trailing edge 23a of the aerofoil 20a.

Moreover, the leading edge 22,22a of the aerofoils 20,20a could also be wavy or snake-like (according to the position in which the cross sections of the aerofoil are stacked).

Further, a blade in which the load varies linearly (and not with parabolic trend) along the height between the radial ends could be taken as standard aerofoil.

The invention claimed is:

1. A method for making a turbine aerofoil starting from a reference aerofoil, comprising the steps of:
   a) establishing five zones along a trailing edge of the turbine aerofoil with a zone 1 comprising 0-10% thereof, a zone 2 comprising 10-25% thereof, a zone 3 comprising 25-75% thereof, a zone 4 comprising 75-90% thereof, and a zone 5 comprising 90-100% thereof;

b) locally reducing the metallic exit angle at the trailing edge with respect to the areas of zones 2 and 4 which correspond substantially, in use, to the position of the peaks of the secondary flows in the boundary layer; and c) increasing the metallic exit angle in the remaining areas of zones 1, 3 and 5 the trailing edge, with respect to that of the reference aerofoil, so as to substantially restore the same average value of the metallic exit angle of the reference aerofoil.

2. The method according to claim 1 wherein the reduction of the metallic exit angle in zones 2 and 4 is less than or equal to 2°.

3. The method according claim 1, wherein said reference aerofoil is defined by an aerofoil in which a load along a height of the aerofoil varies with a linear or parabolic law along the height of the aerofoil.

4. The method according claim 1, wherein a load along a height of the aerofoil varies along the height of the aerofoil with a fourth degree polynomial law.

5. A method for making a turbine aerofoil starting from a reference aerofoil, comprising the steps of:

a) establishing five zones along a height of a trailing edge of the turbine aerofoil with a zone 1 comprising 0-10% thereof, a zone 2 comprising 10-25% thereof, a zone 3 comprising 25-75% thereof, a zone 4 comprising 75-90% thereof, and a zone 5 comprising 90-100% thereof;

b) modifying each metallic exit angle along the area of each of zones 1-5 to be increased or reduced relative to a metallic exit angle of the reference aerofoil; and c) creating the metallic exit angle at the trailing edge with respect to the areas of zones 2 and 4 which correspond substantially, in use, to the position of the peaks of the secondary flows in the boundary layer, to be opposite to the modification of the metallic exit angle being made along zones 1, 3 and 5 of the turbine aerofoil.

6. The method for making a turbine aerofoil as in claim 5 further including the steps of:

reducing the metallic exit angle in zones 2 and 4, and increasing the metallic exit angle in zones 1, 3 and 5.

* * * * *